US009774765B2

(12) United States Patent
Bryll et al.

(10) Patent No.: US 9,774,765 B2
(45) Date of Patent: Sep. 26, 2017

(54) CHROMATIC ABERRATION CORRECTION IN IMAGING SYSTEM INCLUDING VARIABLE FOCAL LENGTH LENS

(71) Applicant: Mitutoyo Corporation, Kanagawa-ken (JP)

(72) Inventors: Robert Kamil Bryll, Bothell, WA (US); Mark Lawrence Delaney, Shoreline, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 21 days.

(21) Appl. No.: 14/854,624

(22) Filed: Sep. 15, 2015

(65) Prior Publication Data

US 2017/0078532 A1    Mar. 16, 2017

(51) Int. Cl.
*H04N 9/73* (2006.01)
*H04N 9/07* (2006.01)
(Continued)

(52) U.S. Cl.
CPC ......... *H04N 5/2178* (2013.01); *G02B 21/365* (2013.01); *G06T 5/005* (2013.01);
(Continued)

(58) Field of Classification Search
CPC ............ H04N 5/23212; H04N 5/3656; H04N 5/3696; H04N 5/23258; H04N 5/23287; G02B 27/0075; G02B 27/00; G03B 13/36
(Continued)

(56) References Cited

U.S. PATENT DOCUMENTS 6,542,180 B1    4/2003  Wasserman et al.
7,324,682 B2    1/2008  Wasserman
(Continued)

FOREIGN PATENT DOCUMENTS

DE    10 2007 001 010 A1    7/2008
JP            10-28271 A        1/1998
(Continued)

OTHER PUBLICATIONS

Aschwanden, "Autofocus microscope with a constant numerical aperture (NA) and field of view (FOV)," Optotune AG, Oct. 2013, 6 pages.
(Continued)

*Primary Examiner* — Lin Ye
*Assistant Examiner* — Euel Cowan
(74) *Attorney, Agent, or Firm* — Seed Intellectual Property Law Group LLP

(57) ABSTRACT

An image acquisition system is operated to provide an image that is relatively free of the effect of longitudinal chromatic aberration. The system includes a variable focal length lens (e.g., a tunable acoustic gradient index of refraction lens) that is operated to periodically modulate a focus position. First, second, third, etc., wavelength image exposure contributions are provided by operating an illumination system to provide instances of strobed illumination of first, second, third, etc., wavelengths (e.g., green, blue, red, etc.) timed to correspond with respective phase timings of the periodically modulated focus position which focus the respective wavelength image exposure contributions at the same focus plane. The respective phase timings of the periodically modulated focus position compensate for longitudinal chromatic aberration of at least the variable focal length lens. An image is produced that is relatively free of the effect of
(Continued)

longitudinal chromatic aberration by combining the image exposure contributions.

20 Claims, 8 Drawing Sheets

(51) Int. Cl.
| | |
|---|---|
| H04N 9/04 | (2006.01) |
| H04N 5/225 | (2006.01) |
| H04N 5/217 | (2011.01) |
| G02B 21/36 | (2006.01) |
| H04N 5/235 | (2006.01) |
| G06T 5/00 | (2006.01) |
| G06T 7/40 | (2017.01) |
| G06T 7/00 | (2017.01) |
| H04N 5/232 | (2006.01) |

(52) U.S. Cl.
CPC ............ *G06T 7/0004* (2013.01); *G06T 7/408* (2013.01); *H04N 5/2354* (2013.01); *H04N 5/23212* (2013.01); *H04N 9/045* (2013.01); *H04N 9/07* (2013.01); *G06T 2207/10024* (2013.01); *G06T 2207/10152* (2013.01)

(58) Field of Classification Search
USPC ............... 348/108, 141, 151, 152, 255, 143, 348/208.12, 220.1, 221.1, 225.1, 241, 348/263, 345, 348–357, 361, 370, 371; 382/70, 79, 86, 92, 94, 125, 128, 382/131–135, 224.1, 225.1, 362, 367, 371
See application file for complete search history.

(56) References Cited

U.S. PATENT DOCUMENTS

| | | | |
|---|---|---|---|
| 7,454,053 | B2 | 11/2008 | Bryll et al. |
| 7,567,713 | B2 | 7/2009 | Ding |
| 7,570,795 | B2 | 8/2009 | Yu et al. |
| 7,626,705 | B2 | 12/2009 | Altendorf |
| 7,627,162 | B2 | 12/2009 | Blanford et al. |
| 7,668,388 | B2 | 2/2010 | Bryll |
| 7,723,657 | B2 | 5/2010 | Altendorf et al. |
| 7,728,961 | B2 | 6/2010 | Watson |
| 7,769,222 | B2 | 8/2010 | Blanford, Jr. et al. |
| 8,111,905 | B2 | 2/2012 | Campbell |
| 8,111,938 | B2 | 2/2012 | Bryll et al. |
| 8,194,307 | B2 | 6/2012 | Arnold et al. |
| 8,212,997 | B1 | 7/2012 | Xie |
| 8,269,830 | B1 | 9/2012 | Delaney |
| 8,581,162 | B2 | 11/2013 | Campbell |
| 8,587,772 | B2 | 11/2013 | Sesko et al. |
| 8,587,789 | B2 | 11/2013 | Sesko |
| 8,860,931 | B2 | 10/2014 | Patzwald |
| 8,902,307 | B2 | 12/2014 | Delaney et al. |
| 8,917,940 | B2 | 12/2014 | Bryll |
| 8,957,960 | B2 | 2/2015 | Saylor et al. |
| 9,013,574 | B2 | 4/2015 | Saylor et al. |
| 9,060,117 | B2 | 6/2015 | Bryll et al. |
| 9,143,674 | B2 | 9/2015 | Gladnick |
| 2005/0195483 | A1* | 9/2005 | Grot ............ G01J 3/10 351/159.63 |
| 2008/0174835 | A1* | 7/2008 | Lee .................. H04N 1/02815 358/497 |
| 2013/0027538 | A1 | 1/2013 | Ding et al. |
| 2013/0141782 | A1 | 6/2013 | Theriault et al. |
| 2013/0148196 | A1 | 6/2013 | Arnold |
| 2013/0162806 | A1 | 6/2013 | Ding et al. |
| 2013/0162807 | A1 | 6/2013 | Bryll et al. |
| 2013/0321927 | A1 | 12/2013 | Arnold et al. |
| 2014/0036346 | A1 | 2/2014 | Arnold et al. |
| 2014/0049633 | A1* | 2/2014 | Pretorius ............ G02B 21/0012 348/79 |
| 2014/0168752 | A1 | 6/2014 | Arnold et al. |
| 2014/0211299 | A1 | 7/2014 | Arnold et al. |
| 2014/0253686 | A1* | 9/2014 | Wong .................. H04N 13/0285 348/46 |
| 2014/0294284 | A1 | 10/2014 | Bryll |
| 2014/0300726 | A1 | 10/2014 | Gladnick |
| 2014/0368726 | A1 | 12/2014 | Gladnick |
| 2014/0375776 | A1* | 12/2014 | Abolbashari ........ G02B 27/005 348/49 |
| 2015/0009484 | A1 | 1/2015 | Sesko |
| 2015/0015696 | A1 | 1/2015 | Delaney |
| 2015/0136949 | A1* | 5/2015 | De Nooij ........... G02B 21/0016 250/208.1 |
| 2015/0145980 | A1 | 5/2015 | Bryll |
| 2015/0227025 | A1* | 8/2015 | Park ...................... G03B 15/05 348/224.1 |
| 2016/0131885 | A1* | 5/2016 | Nakayama ......... G01N 21/6428 250/458.1 |

FOREIGN PATENT DOCUMENTS

| | | |
|---|---|---|
| JP | 2009-116244 A | 5/2009 |
| WO | 96/37797 A1 | 11/1996 |

OTHER PUBLICATIONS

Blum et al., "Compact optical design solutions using focus tunable lenses," SPIE Optical Design and Engineering IV, Proceeding vol. 8167, Sep. 22, 2011, 9 pages.
Chen et al., "Remote focal scanning optical projection tomography with an electrically tunable lens," Biomedical Optics Express, vol. 5(10), Oct. 2014, 9 pages.
Duocastella et al., "Simultaneous imaging of multiple focal planes for three-dimensional microscopy using ultra-high-speed adaptive optics," SPIE, Journal of Biomedical Optics, May 2012, 4 pages.
Fahrbach et al., "Rapid 3D light-sheet microscopy with a tunable lens," Optics Express, vol. 21(18), Sep. 9, 2013, 17 pages.
Lipp et al., "Rapid Beam Shaping and Focussing Using Tunable Acoustic Gradient Index Lenses," Department of Mechanical and Aerospace Engineering, May 4-9, 2008, 5 pages.
McLeod et al., "Mechanics and refractive power optimization of tunable acoustic gradient lenses," Journal of Applied Physics 102, 033104 (2007), Aug. 8, 2007, 9 pages.
Mermillod-Blondin et al., "High-speed varifocal imaging with a tunable acoustic gradient index of refraction lens," Optics Letters, vol. 33(18), Princeton, New Jersey, Sep. 15, 2008, 3 pages.
Nagahara et al., "Flexible Depth of Field Photography," Proceedings of the European Conference on Computer Vision, Oct. 2008, 14 pages.
Olivier et al., "Two-photon microscopy with simultaneous standard and extended depth of field using a tunable acoustic gradient-index lens," Optical Society of America, Optics Letters, vol. 34(11), Jun. 1, 2009, 3 pages.
Optotune AG, "Optical focusing in microscopy with Optotune's focus tunable lens EL-10-30," Application Note, Sep. 2011, 13 pages.
Tag Optics Inc., "The Physics Behind Tag Optics' Technology and the Mechanism of Action of Using Sound to Shape Light," Application Notice 12001, Physics Behind the Tag Technology, Mar. 2013, 6 pages.
"QVPAK 3D CNC Vision Measuring Machine Operation Guide," Version 2.0, published Sep. 1996, 86 pages.
"QVPAK 3D CNC Vision Measuring Machine User's Guide," Version 7, published Jan. 2003, 217 pages.
Gladnick, U.S. Appl. No. 14/795,409, filed Jul. 9, 2015, "Adaptable Operating Frequency of Variable Focal Length Lens in an Adjustable Magnification Optical System," 58 pages.
Extended European Search Report, dated Jan. 24, 2017, for European Application No. 16188331.9-1902, 10 pages.

\* cited by examiner

CHROMATIC ABERRATION CORRECTION IN IMAGING SYSTEM INCLUDING VARIABLE FOCAL LENGTH LENS

BACKGROUND

Technical Field

This disclosure relates to precision metrology, and more particularly to image acquisition systems such as machine vision inspection systems.

Description of the Related Art

Image acquisition systems such as precision machine vision inspection systems (or "vision systems" for short) may be used for precise measurements of objects and to inspect other object characteristics. Such systems may include a computer, camera, optical system, and a stage that moves to allow workpiece traversal. One exemplary system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of small or large workpieces at various magnifications.

In various applications, it is desirable to perform high-speed autofocus and/or other operations to facilitate high-speed measurements for high throughput in either stationary or non-stop moving inspection systems. The speed of autofocus and other operations requiring focusing in conventional machine vision inspection systems is limited by the motion of the camera through a range of Z-height positions. There is a need for improved autofocus and/or other operations utilizing alternative methods of collecting images at a high speed without compromising image quality and/or dimensional accuracy in the images.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An image acquisition system is operated to provide an image that is relatively free of the effect of longitudinal chromatic aberration in one or more lenses of the image acquisition system. The image acquisition system includes an imaging system, an illumination system, and a controller. The imaging system includes a variable focal length lens (e.g., a tunable acoustic gradient index of refraction lens) that is operated to periodically modulate a focus position of the imaging system over a plurality of focus positions along a Z-height direction. First, second, third, etc., wavelength image exposure contributions are provided by operating the illumination system to provide instances of strobed illumination of first, second, third, etc., wavelengths (e.g., red, blue, green, etc.) timed to correspond with respective phase timings of the periodically modulated focus position which focus the respective wavelength image exposure contributions at a first focus plane. The respective phase timings of the periodically modulated focus position compensate for longitudinal chromatic aberration of at least the variable focal length lens. A wavelength combining image is produced that is relatively free of the effect of longitudinal chromatic aberration by combining the image exposure contributions.

DETAILED DESCRIPTION

Figure 1:
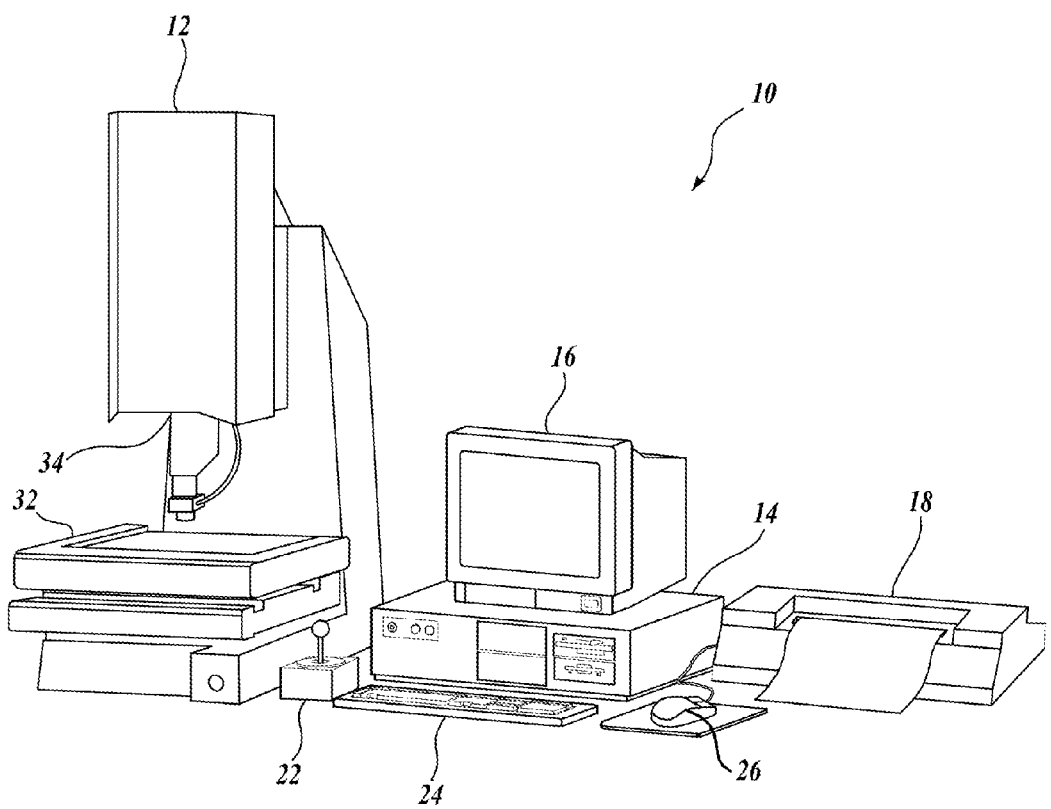
FIG. 1 is a diagram showing various typical components of a general-purpose precision machine vision inspection system.

FIG. 1 is a block diagram of one exemplary machine vision inspection system 10 usable in accordance with principles disclosed herein. The machine vision inspection system 10 includes a vision measuring machine 12 that is operably connected to exchange data and control signals with a controlling computer system 14, and with a monitor or display 16, a printer 18, a joystick 22, a keyboard 24, and a mouse 26. The monitor or display 16 may display a user interface suitable for controlling and/or programming the machine vision inspection system 10. In various implementations, a touchscreen tablet or the like may be substituted for and/or redundantly provide the functions of any or all of the computer system 14, the display 16, the joystick 22, the keyboard 24, and the mouse 26.

More generally, the controlling computer system 14 may comprise or consist of any computing system or device, and/or distributed computing environment, and the like, any of which may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications (e.g., 0.5× to 100×) for the images provided by the optical imaging system 34. Similar machine vision inspection systems are described in commonly assigned U.S. Pat. Nos. 7,454,053; 7,324,682; 8,111,905; and 8,111,938, each of which is hereby incorporated herein by reference in its entirety.

Figure 2:
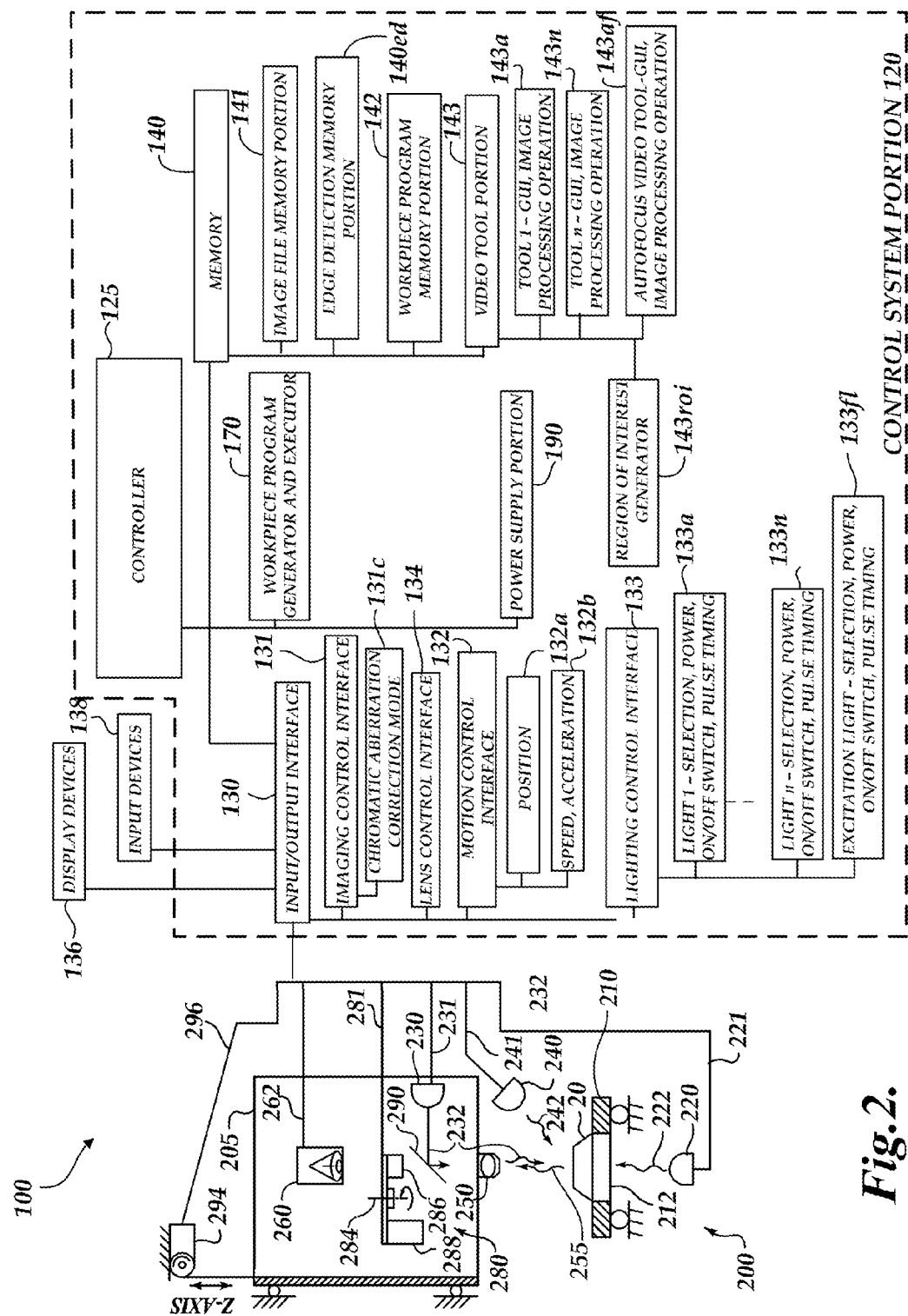
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses (e.g., a set ranging from 0.5× to 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. A workpiece 20, or a tray or fixture holding a plurality of workpieces 20, which is to be imaged using the machine vision inspection system 100 that is placed on the workpiece stage 210. The workpiece stage 210 may be controlled to move relative to the optical assembly portion 205, such that the interchangeable objective lens 250 moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and a lens control interface 134. The lens control interface 134 may include a lens controller including a lens focus operating circuit and/or routine, or the like. In various implementations, the lens control interface 134 may further include a magnification change adjustment mode, which may be selected or automatically implemented when a magnification change is made or detected, as described in more detail in co-pending and commonly assigned U.S. patent application Ser. No. 14/795,409, entitled "Adaptable Operating Frequency of a Variable Focal Length Lens in an Adjustable Magnification Optical System", filed on Jul. 9, 2015, which is hereby incorporated herein by reference in its entirety.

In various implementations, in accordance with the principles disclosed herein, the imaging control interface 131 may include a chromatic aberration correction mode 131c, as will be described in more detail below with respect to FIGS. 3-8. Briefly, in one implementation, the chromatic aberration correction mode 131c may utilize the multilevel focus capability of the system to correct for longitudinal chromatic aberration by adjusting the relative timing of illumination pulses in response to the wavelength of the respective illumination source (e.g., red, blue, green, etc.). By combining image exposure contributions that result from the illumination pulses, an image may be produced that is relatively free of the effect of longitudinal chromatic aberration.

In various implementations, the imaging control interface 131 may further include an extended depth of field mode, as described in more detail in co-pending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. The motion control interface 132 may include a position control element 132a, and a speed/acceleration control element 132b, although such elements may be merged and/or indistinguishable. The lighting control interface 133 may include lighting control elements 133a, 133n, and 133fl that control, for example, the selection, power, on/off switch, and strobe pulse timing, if applicable, for the various corresponding light sources of the machine vision inspection system 100.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. The autofocus video tool 143af may additionally include a high-speed focus height tool that may be utilized to measure focus heights with high speed, as described in more detail in co-pending and commonly assigned U.S. Patent Publication No. 2014/0368726, which is hereby incorporated herein by reference in its entirety. In various implementations, the chromatic aberration correction mode 131c may be utilized as part of, or otherwise included in, one or more of the video tools (e.g., the autofocus video tool 143af, a separate video tool, etc.).

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool, with the underlying operations being included implicitly.

The signal lines or busses 221, 231, and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features (e.g., as associated with the chromatic aberration correction mode 131c, the autofocus video tool 143af, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one or more of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a current workpiece (e.g., a run mode workpiece), or workpieces, which is similar to the representative workpiece used when creating the part program.

Figure 3:
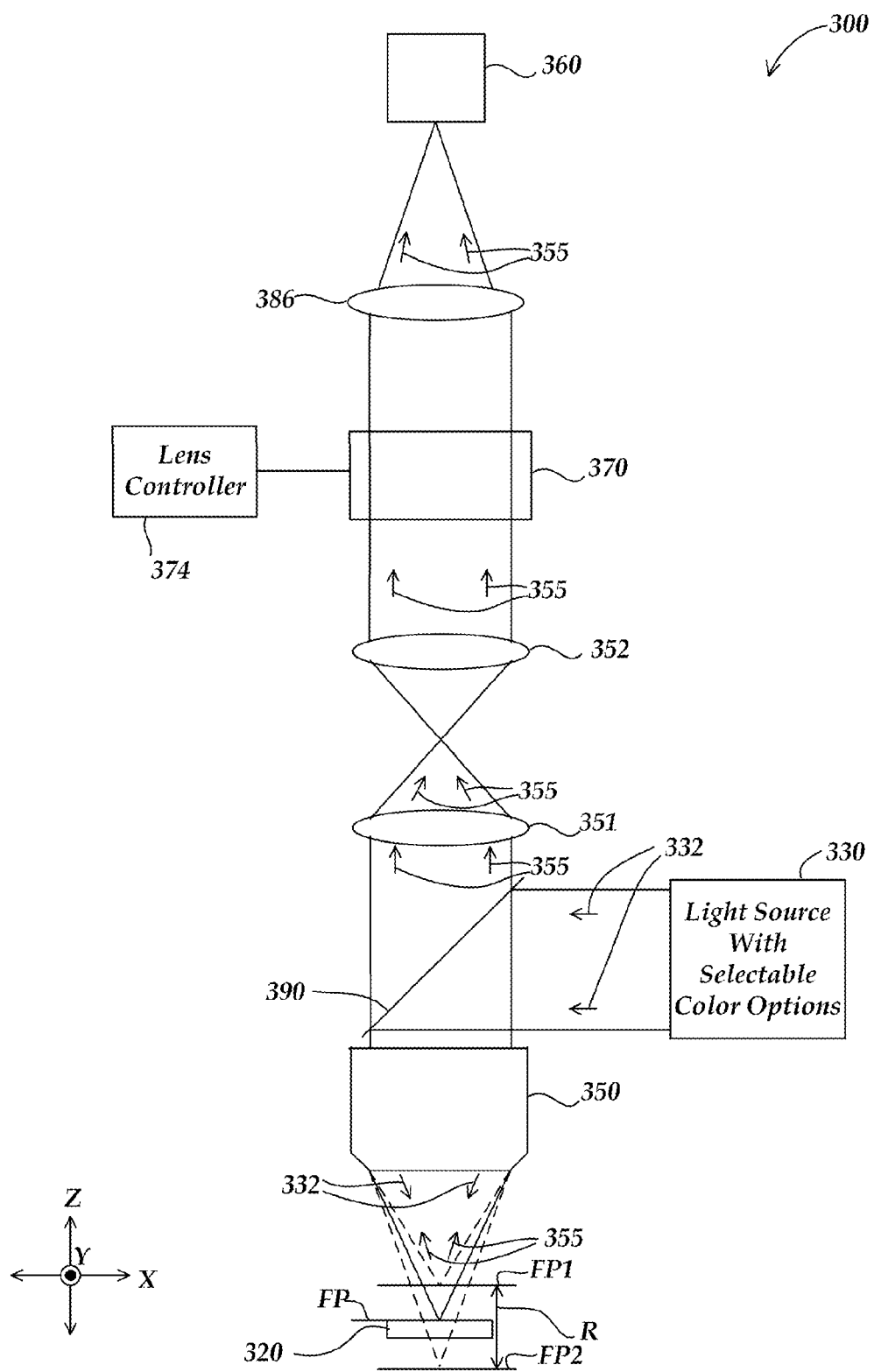
FIG. 3 is a schematic diagram of an image acquisition system that may be adapted to a machine vision inspection system and operated according to principles disclosed herein.

FIG. 3 is a schematic diagram of an image acquisition system 300 that may be adapted to a machine vision inspection system and operated according to the principles disclosed herein. The image acquisition system 300 comprises a light source 330 that is configurable to illuminate a workpiece 320 (e.g., with strobed or continuous-wave illumination) in a field of view of the imaging system 300, an objective lens 350, a tube lens 351, a relay lens 352, a variable focal length lens (VFL) 370, a relay lens 386, and a camera system 360.

In various implementations, the light source 330 may include first, second, third, etc., sources of illumination as part of an illumination system. For example, the light source 330 may be operated to provide an instance of strobed illumination of a particular wavelength (e.g., a second wavelength) by operating a corresponding source of illumination (e.g., a second source of illumination that is part of the light source 330). In various implementations, in order to achieve proper color balance, the light source 330 may be controllable so as to allow for independent adjustment of the intensity of all instances of strobed illumination (e.g., each corresponding to a different source of illumination within the light source 330) as well as simultaneous adjustment to control an overall brightness of an image.

In operation, in the embodiment shown in FIG. 3, the light source 330 is a "coaxial" light source configured to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In other embodiments, analogous light sources may illuminate the field of view in a non-coaxial manner, for example a ring light source may illuminate the field of view. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to the camera system 360. In various implementations, the camera system 360 may capture an image of the workpiece 320 during an image exposure period, and may provide the image to a control system portion (e.g., similar to the operation of the camera system 260 for providing an image to the control system portion 120 in FIG. 2). In various implementations, as described in more detail in the previously incorporated '726 publication, the camera system 360 may comprise a sensor with a global shutter, i.e., a sensor, that exposes each pixel simultaneously. Such an embodiment is advantageous in that it provides the capability to measure image stacks without motion of a workpiece or any part of the imaging system 300.

The VFL lens 370 is electronically controllable to vary the focus position FP of the imaging system during one or more image exposures. The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.).

In various implementations, a machine vision inspection system may comprise a control system (e.g., the control system portion 120 of FIG. 2) that is configurable to operate in conjunction with a lens controller 374 or to otherwise control the VFL lens 370 to periodically modulate a focus position of the imaging system 300. In some implementations, the VFL lens 370 may very rapidly adjust or modulate the focus position (e.g., periodically, at a rate of at least 300 Hz, or 3 kHz, or 70 kHz, or much higher). In one example implementation, the range R may be approximately 10 mm (e.g., for a 1× objective lens 350). In various implementations, the VFL lens 370 is advantageously chosen such that it does not require any macroscopic mechanical adjustments in the imaging system and/or adjustment of the distance between the objective lens 350 and the workpiece 320 in order to change the focus position FP. In such a case, as described in the previously incorporated '980 publication, an extended depth of field image may be acquired. Furthermore there are no macroscopic adjustment elements or associated positioning non-repeatability to degrade accuracy when the same imaging system is used for acquiring fixed focus inspection images, which may be used for precision measurements (e.g., for accuracies on the order of a few micrometers, or tenths of micrometers, or less, and the like). As described in the previously incorporated '726 publication, the changes in the focus position FP may also be utilized to rapidly acquire an image stack including a plurality of images at a plurality of positions along a Z-height direction proximate to the workpiece 320.

In various implementations, the VFL lens 370 may be a tunable acoustic gradient index of refraction ("TAG") lens. A tunable acoustic gradient index of refraction lens is a high-speed VFL lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 KHz.

The VFL lens 370 may be driven by the lens controller 374, which may generate a signal to operate the VFL lens 370. In one embodiment, the lens controller 374 may be a commercial controllable signal generator. In some implementations, the lens controller 374 may be configured or controlled by a user and/or an operating program through the imaging control interface 131 and/or the chromatic aberration correction mode 131c and/or the lens control interface 134, as outlined previously with respect to FIG. 2. In some implementations, the VFL lens 370 may be operated using a periodic signal such that the focus position FP is modulated sinusoidally over time, at a high frequency. For example, in some exemplary implementations, a tunable acoustic gradient index of refraction lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the VFL lens 370 may comprise a controllable fluid lens, or the like.

In the example of FIG. 3, the relay lenses 352 and 386 and the VFL lens 370 are designated as being included in a 4 f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance $F_{TUBE}$ of the tube lens 351 is illustrated as being approximately equidistant to a midpoint between the lenses 351 and 352, as is a focal distance f of the relay lens 352. In alternative implementations, the focal distance $F_{TUBE}$ for the tube lens 351 may be made to be different than the focal distance f of the relay lens 352 (which corresponds to one of the 4 f's of the 4 f optical configuration). In various implementations where the tube lens 351 may be included as part of a turret lens assembly, it may be desirable for other tube lenses of the turret lens assembly when rotated into the operational position to have a focal point at the same location (i.e., so as to meet the focal point of the relay lens 352).

As described in more detail in the previously incorporated '409 application, the ratio of the focal distance $F_{TUBE}$ to the focal distance f can be utilized to alter the diameter of the collimated beam of workpiece light 355 out of the relay lens 352 relative to the collimated beam of the workpiece light 355 that is input to the tube lens 351. It will be appreciated with respect to the collimated beams of workpiece light 355 that are respectively input to the tube lens 351 and output from the relay lens 352, that in various implementations such collimated beams may be extended into longer path lengths, and/or beam splitters may be utilized with respect to such collimated beams for providing additional optical paths (e.g., as directed to different camera systems, etc.).

In various implementations, the illustrated 4f optical configuration permits placing the VFL lens 370 (e.g., which may be a low numerical aperture (NA) device, such as a tunable acoustic gradient index of refraction lens), at the Fourier plane of the objective lens 350. This configuration may maintain the telecentricity at the workpiece 320 and may minimize scale change and image distortion (e.g., including providing constant magnification for each Z-height of the workpiece 320 and/or focus position FP). The Keplerian telescope configuration (e.g., including the tube lens 351 and the relay lens 352) may be included between the microscope configuration and the 4 f optical configuration, and may be configured to provide a desired size of the projection of the objective lens clear aperture at the location of the VFL lens, so as to minimize image aberrations, etc.

It will be appreciated that in various implementations, certain types of dimensional measurements may require near-diffraction or diffraction-limited imaging. The configuration illustrated in FIG. 3 reduces aberrations by restricting the off-axis extent of the pupil of the objective lens 350 that is imaged into the VFL lens 370. In this configuration, the radial extent may be maintained to be less than the radial extent of the 1st Bessel ring in the refractive index profile of the standing wave of the VFL lens 370 (e.g., a tunable acoustic gradient index of refraction lens) at its lowest resonant frequency $f_{R,MIN}$, as described in more detail in the previously incorporated '409 application. In this manner, light from the microscope configuration (i.e., including the objective lens 350 and the tube lens 351) does not exceed the largest clear aperture $CA_{VFL,MAX}$ of the VFL lens 370. In an implementation where the light did exceed the largest clear aperture, the light could interact with the region of the standing wave of the VFL lens 370 that may have an undesirable refractive index which could increase aberrations and reduce dimensional measurement precision.

In various implementations, the VFL lens 370 and/or other lenses of the system (e.g., the objective lens 350, etc.) may exhibit various levels of longitudinal (e.g., axial) chromatic aberration. As will be described in more detail below, in accordance with the principles disclosed herein the multilevel focus capability of the system may be utilized to correct for longitudinal chromatic aberration by adjusting the relative timing of the illumination pulses in response to the wavelength of the illumination light.

Figure 4:
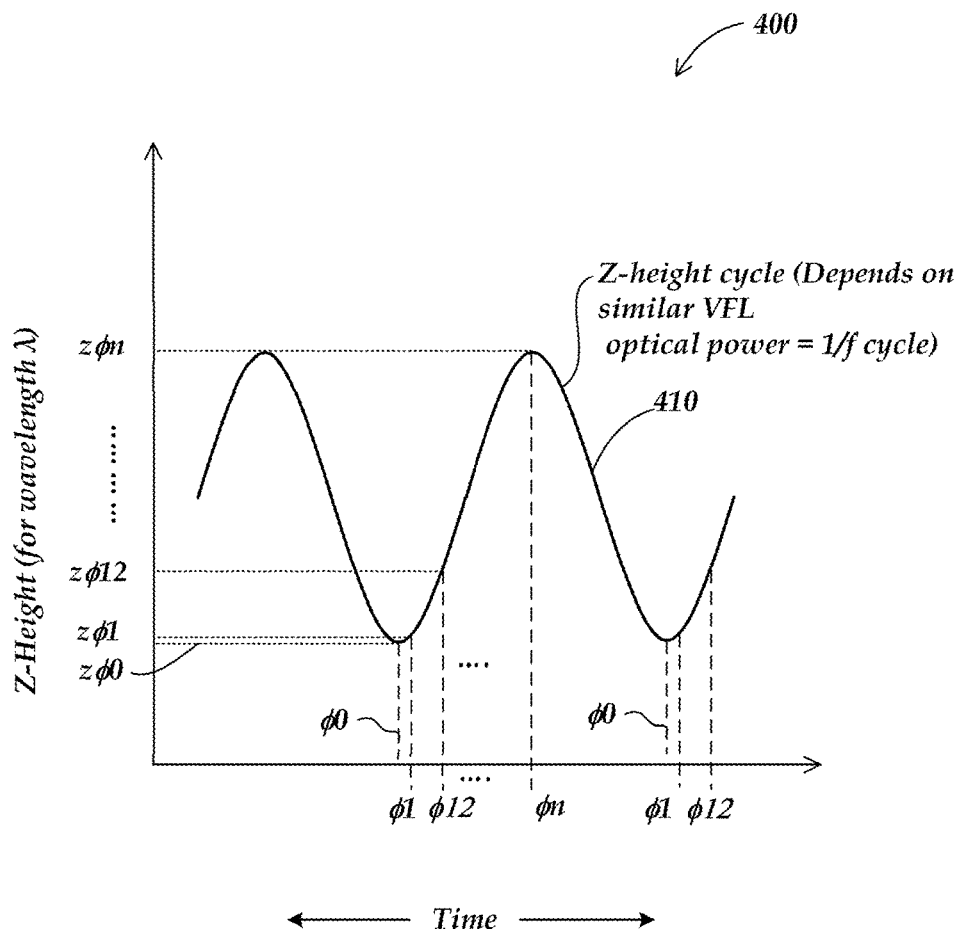
FIG. 4 is a chart of a timing diagram illustrating phase timing for an illumination wavelength versus Z-height according to a periodically modulated focus position of the image acquisition system of FIG. 3.

FIG. 4 is a chart of a timing diagram 400 illustrating phase timing for an illumination wavelength versus Z-height according to a periodically modulated focus position of the image acquisition system of FIG. 3. The periodically modulated focus position is controlled by periodically modulating the focal length of the VFL lens 370, as outlined above. The periodically modulated Z-height is represented by the sinusoidal curve 410, also labeled "Z-height cycle". In various implementations, the shape of the curve 410 may depend on the lenses in series (e.g., the objective lens 350, VFL lens 370, etc., as illustrated in FIG. 2), for which the optical power of the VFL lens 370 goes through a cycle as indicated in FIG. 4 and is equal to 1/f (where f=focal length). As will be described in more detail below, the relationship of the Z-height to the phase timing may be established by calibration according to known principles (e.g., by repeatedly stepping a surface to a known Z-height, and then manually or computationally determining the phase timing that best focuses an image at the known Z-height, and storing that relationship in a lookup table or the like).

The timing diagram 400 also qualitatively shows how strobed illumination of an exemplary wavelength can be timed to correspond with a respective phase timing (e.g., $\phi 0$, $\phi 1$, $\phi 12$, $\phi n$, etc.) of the periodically modulated focus position to expose an image focused at a respective Z-height (e.g., $z\phi 0$, $z\phi 1$, $z\phi 12$, $z\phi n$, etc.). That is, in the illustrated example, while a digital camera is acquiring an image during an integration period, if a strobe pulse is short relative to the period of the focus modulation and is provided at the phase timing $\phi 0$, then the focus position will be at the height $z\phi 0$, and any workpiece surface that is located at the height $z\phi 0$ will be in focus in the resulting image. It will be appreciated that the same is true for the other exemplary phase timings and Z-heights shown in the timing diagram 400.

It will be understood that the phase timings shown in the timing diagram 400 are exemplary only and not limiting. More generally, any phase timing selected by a user or automatically selected by a control system will have an associated focus position Z-height within the range of focus positions $z\phi 0$-$z\phi n$, which represent the minimum and maximum Z-heights of the periodically modulated Z-height of the focus position. It will also be understood that if one strobe pulse at a particular phase timing is not sufficient to provide a well-exposed image, that the strobe pulse may be repeated at that particular phase timing for any desired number of periods within the image integration period (e.g., as schematically illustrated by the repeated instances of any of the exemplary phase timings $\phi 0$, $\phi 1$, $\phi 12$ in the timing diagram 400). In various implementations, any number of such pulses (e.g., one, thousands, etc.) may be integrated in an integration period. The effect will be to increase the image exposure (e.g., the image brightness) corresponding to that particular phase timing and/or Z-height in the resulting image. As one specific example implementation, for a VFL lens that modulates at a frequency of 72 kHz and an imaging array in a camera operating at 30 frames per second, a single camera frame acquisition time corresponds to 2,400 cycles of the variable focal length lens and the resulting focus position Z-height.) It should be appreciated that the exemplary phase timings $\phi 1$ and $\phi 12$ are shown on a rising slope of the Z-height cycle. In some embodiments, pulses may also be integrated in an integration period which corresponds to the same Z-heights during a falling slope of the Z-height cycle.

Figure 5:
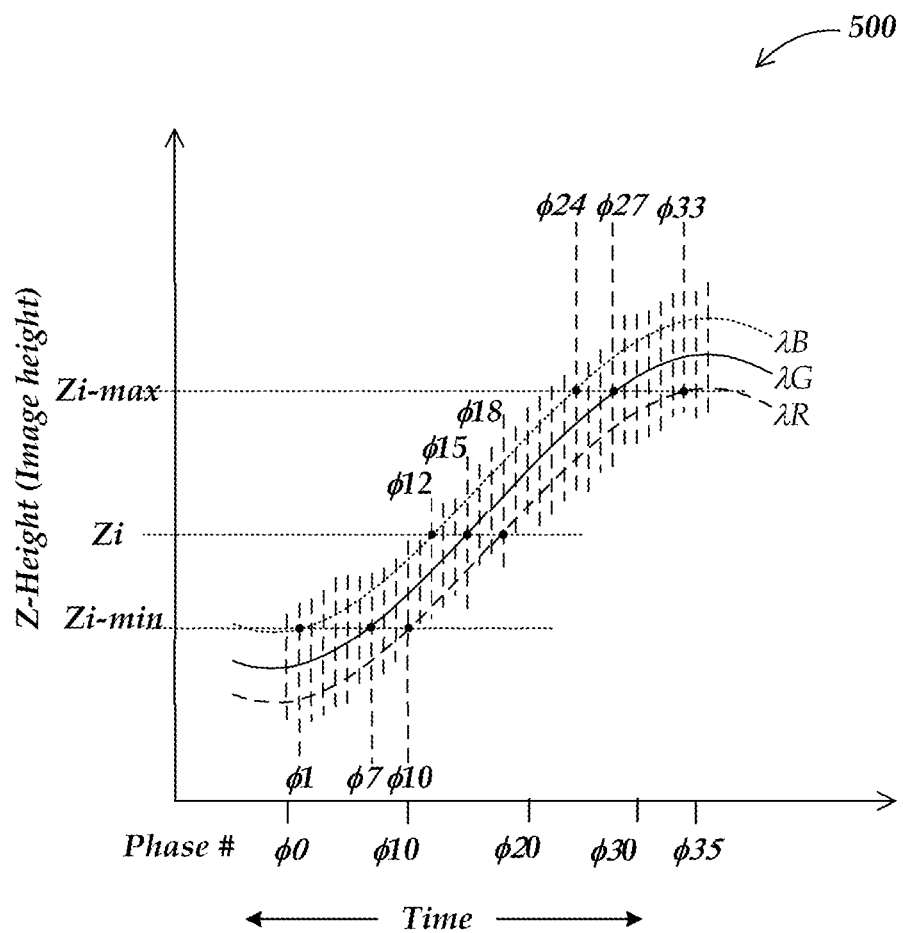
FIG. 5 is a chart of a timing diagram illustrating phase timings for three illumination wavelengths versus Z-height.
Figure 6:
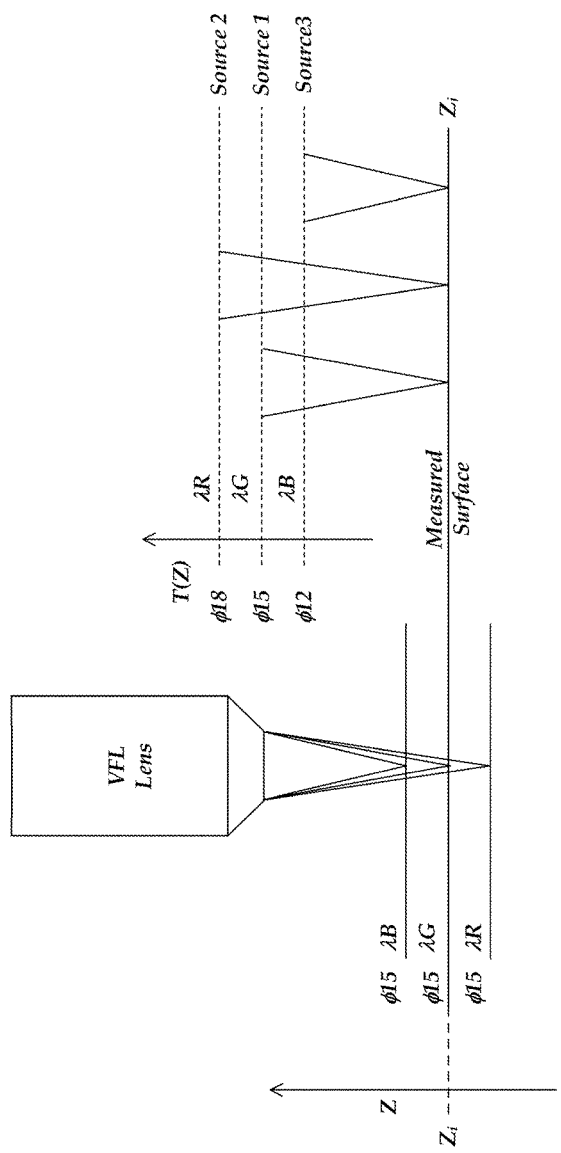
FIGS. 6A and 6B are diagrams illustrating strobed illumination of three wavelengths and corresponding phase timings determined according to calibration data for focusing at a common focus plane.

FIG. 5 is a chart of a timing diagram 500 illustrating phase timings for three illumination wavelengths $\lambda G$, $\lambda B$ and $\lambda R$ (e.g., corresponding to green, blue and red illumination, respectively) versus Z-height. In one implementation, the timing diagram 500 may be considered to represent a horizontally expanded portion of the periodically modulated Z-height of the focus position shown by the curve 410 in FIG. 4, except as illustrated for the three illumination wavelengths $\lambda G$, $\lambda B$ and $\lambda R$ rather than a single exemplary illumination wavelength. Phase timings $\phi 0$ to $\phi 35$ are represented by the phase timing positions of the vertical dashed lines in the timing diagram 500. Due to longitudinal chromatic aberration exhibited by one or more of the lenses of the imaging system (e.g., the VLF lens 370), the plots for the three wavelengths $\lambda G$, $\lambda B$ and $\lambda R$ have different Z offsets. More specifically, as will be described in more detail below with respect to FIG. 6A, if white (broadband) illumination (e.g., including the three illumination wavelengths $\lambda G$, $\lambda B$ and $\lambda R$) is utilized with a single phase timing, due to the longitudinal chromatic aberration, each of the wavelengths $\lambda G$, $\lambda B$ and $\lambda R$ will be focused at a different Z-height.

As illustrated in FIG. 5, at a Z-height Zi, the illumination wavelength $\lambda B$ has a corresponding phase timing $\phi 12$, the illumination wavelength λG has a corresponding phase timing $\phi15$, and the illumination wavelength λR has a corresponding phase timing $\phi18$. This indicates that if an image (e.g., of a workpiece) is to be taken at the Z-height Zi, the corresponding phase timings should be utilized so that each of the image exposure contributions corresponding to each of the wavelengths will be in focus, as will be described in more detail below with respect to FIG. 6B. Due to the Z-height offsets between each of the wavelength curves, "useable" minimum and maximum values may be established for a measurement range (e.g., corresponding to values near the lowest peak and highest trough of the various curves). As an example, as illustrated in FIG. 5, a minimum Z-height Zi-min and a maximum Z-height Zi-max may be established, for which the illumination wavelength λB has corresponding phase timings $\phi1$ and $\phi24$, the illumination wavelength λG has corresponding phase timings $\phi7$ and $\phi27$, and the illumination wavelength λR has corresponding phase timings $\phi10$ and $\phi33$.

As will be described in more detail below, in accordance with the principles disclosed herein, in one implementation image stacks may be acquired during a calibration process utilizing a respective region of interest. As an example with respect to the specific Z-height Zi, as part of a process for determining a phase timing corresponding to a best focus position, a first image stack may be acquired by exposing a first image using one or more strobe illumination pulses of a first wavelength λG (over one or more periods) coinciding with the phase timing $\phi0$. A second image in the first image stack may be similarly acquired using the first wavelength λG and the phase timing $\phi1$, and so on up to $\phi35$ in the illustrated example. It will be understood that an image stack images a field of view using various focus positions, and generally can include any desired number of images at desired Z-heights, acquired using corresponding phase timings. A second image stack may similarly be acquired utilizing a second wavelength λB, a third image stack may similarly be acquired utilizing a third wavelength λR, etc.

As will be described in more detail below with respect to FIG. 7, the acquired image stacks may be utilized for determining calibration data that relates phase timing of a periodically modulated focus position to a focus plane height or distance (e.g., as related to a stage position ZC) for first, second, third, etc., wavelengths of illumination (e.g., corresponding to the illumination wavelengths λG, λB and λR). In various implementations, the longitudinal chromatic aberration may generally depend on the power (e.g., as related to the Z focus position) of the VFL lens. Correspondingly, in various implementations it may be desirable to traverse the entire scan range R of the VFL lens (e.g., or in some instances a smaller desired range such as that between the Z-heights Zi-min and Zi-max as described above), collect focus data for all wavelengths, and create a lookup table for the entire desired range.

In this regard, once collected, each image stack may be analyzed to determine a respective phase timing corresponding to a best focus position for a respective region of interest at a respective Z-height (e.g., such as the phase timings $\phi12$, $\phi15$, and $\phi18$ for the illumination wavelengths λG, λB and λR, respectively, at the Z-height Zi, as illustrated in FIG. 5). As will be described in more detail below, the calibration data may be stored including the respective phase timings as associated with the respective wavelengths and as associated with the respective Z-height, wherein the respective Z-height corresponds to a respective focus plane. In various implementations, additional calibration data may be provided by continuing to adjust the height of the region of interest (e.g., by adjusting the stage position ZC) through a plurality of Z-heights, and for each Z-height repeating the collecting and analyzing of the respective image stacks and the storing of the phase timings as associated with the respective wavelengths and as associated with the respective Z-height. As a specific example, a routine for providing calibration data will be described in more detail below with respect to FIG. 7.

FIGS. 6A and 6B are diagrams illustrating strobed illumination of three wavelengths λG, λB and λR and corresponding phase timings determined according to calibration data for focusing at a common focus plane (e.g., such as the calibration data described above for the Z-height Zi in FIG. 5). In the particular example of FIG. 6A, the object plane is indicated as corresponding to the stage position ZC=Zi. As illustrated in FIG. 6A, if white (broadband) illumination (e.g., including wavelengths λG, λB and λR) is utilized with a single phase timing $\phi15$, the first wavelength λG is shown to be in focus, while the second and third wavelengths λB and λR are shown to be out of focus (e.g., in opposite respective directions). This corresponds to the values indicated in FIG. 5 for the phase timing $\phi15$.

As illustrated in FIG. 6B, by utilizing stored calibration data for adjusting the phase timing for the different wavelengths λG, λB and λR, the respective focal planes can be made to coincide. More specifically, various flash delays corresponding to various phase timings may be utilized, such that a flash delay corresponding to the phase timing $\phi15$ is utilized for a first illumination source for the first wavelength λG, a flash delay corresponding to the phase timing $\phi12$ is utilized for a second illumination source for the second wavelength λB, and a flash delay corresponding to the phase timing $\phi18$ is utilized for a third illumination source for the third wavelength λR. In various implementations, the camera of the imaging system may integrate during all of the wavelength image exposure contributions for producing a wavelength combining image that that is relatively free of the effect of longitudinal chromatic aberration. A routine for providing calibration data such as that indicating the respective phase timings $\phi12$, $\phi15$, and $\phi18$ for the illumination wavelengths λG, λB and λR, respectively, at the Z-height Zi, as well as other Z-heights within a desired range, will be described in more detail below with respect to FIG. 7.

Figure 7:
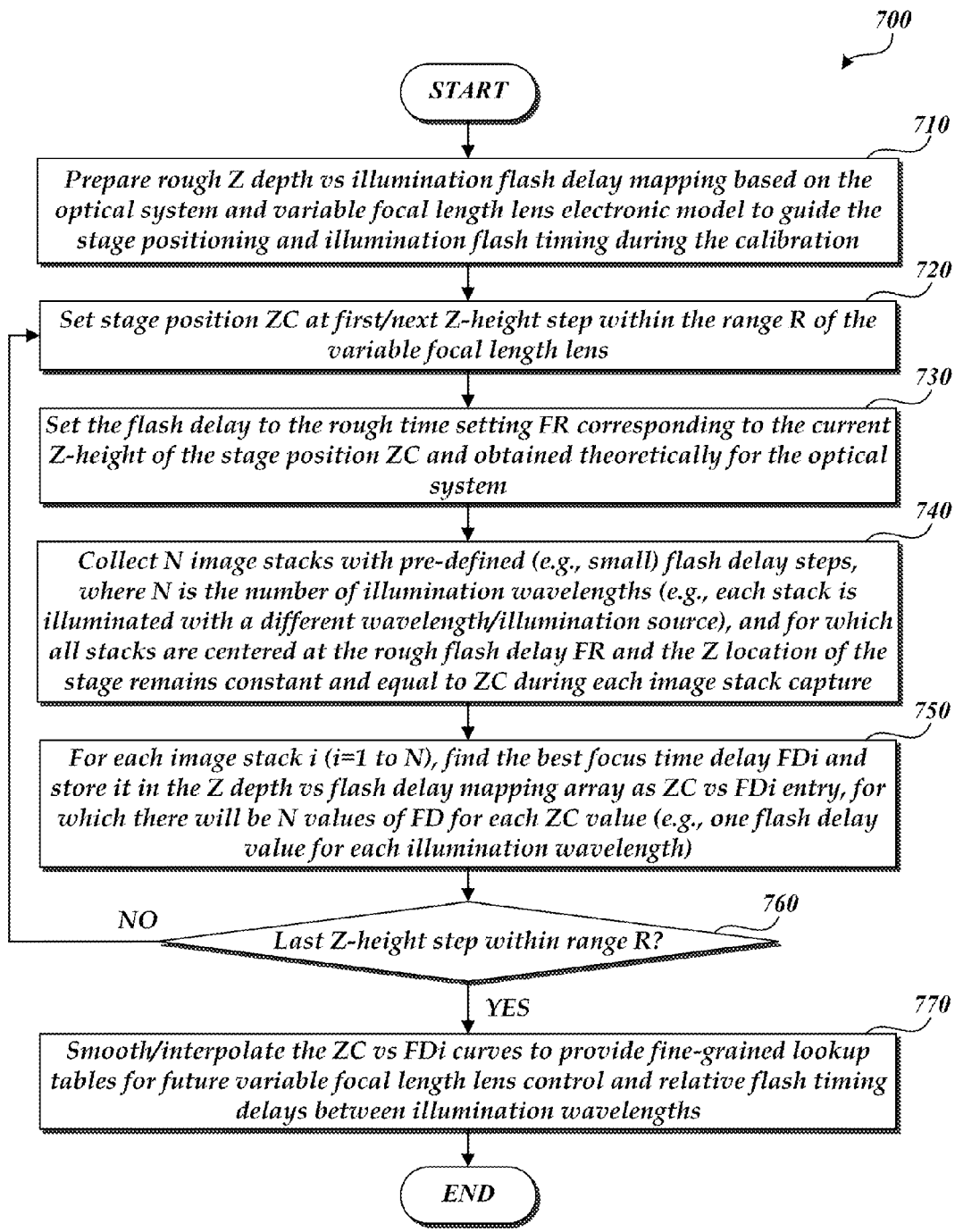
FIG. 7 is a flow diagram illustrating one exemplary implementation of a routine for determining calibration data for an image acquisition system.

FIG. 7 is a flow diagram illustrating one exemplary implementation of a routine 700 for determining calibration data for an image acquisition system. At a block 710, a rough Z depth versus illumination flash delay mapping is prepared based on the optical system and VFL lens electronic model. In various implementations, the flash delay may be defined as an amount of delay from a VFL lens synchronization pulse, and may correspond to a phase timing of the periodically modulated focus position of the VFL lens, which may correspond to a Z focus position of the VFL lens. As will be described in more detail below, the rough mapping may be utilized to guide the stage positioning and illumination flash timing during the calibration. In various implementations, the rough mapping may significantly reduce the required size (e.g., flash delay range) of image stacks needed at each Z step, thus allowing the calibration process to be performed more quickly.

At a block 720, a stage position ZC is set at first/next Z-height step within a range R of the VFL lens. As will be described in more detail below, by returning to the block 720 for subsequent iterations, the routine effectively steps through at least a portion of the range R of the VFL lens in pre-selected steps. In various implementations, where the Z depth versus flash delay mapping may be nonlinear, it may be desirable to space the Z positions at different intervals in response to the expected local slope of the Z depth versus flash delay curve. In various implementations, the accuracy of the calibration may be increased by ensuring the accuracy of the stage positions ZC at each step.

At a block 730, the flash delay is set to a rough time setting FR corresponding to the current stage position ZC and as obtained theoretically for the optical system (e.g., as described above with respect to block 710). At a block 740, N image stacks are collected with pre-defined (e.g., small) flash delay steps. For the collection of the image stacks, N indicates the number of illumination wavelengths (e.g., each stack is illuminated with a different wavelength/illumination source), all stacks are centered at the rough flash delay FR, and the stage position ZC remains constant during each image stack capture.

At a block 750, for each image stack i (i=1 to N), the best focus time delay FDi (e.g., as determined according to a focus peak of the image stack i) is found and stored in a Z depth versus flash delay mapping array (e.g., as a ZC versus FDi entry), for which there will be N values of FD for each ZC value (e.g., one flash delay value for each illumination wavelength). In the example of FIG. 5 above, for the stage position of ZC=Zi, these best focus time delays FDi would correspond to the calibration values indicating the phase timings φ12, φ15, and φ18 for the illumination wavelengths λG, λB and λR, respectively. In various implementations, a standard autofocus method may be utilized as part of the process for determining the best flash delays. For example, in one implementation a contrast peak interpolation may be determined in a time domain (e.g., focus peaks may be determined for the acquired image stacks). In one implementation, a full field of view may be utilized as the autofocus region of interest. Exemplary techniques for the determination and analysis of image stacks and focus curves are taught in U.S. Pat. No. 6,542,180, which is commonly assigned and hereby incorporated herein by reference in its entirety.

At a decision block 760, a determination is made as to whether a last Z-height step within the range R of the VFL lens has been reached. If the last Z-height step within the range R has not been reached, the routine returns to block 720, where the stage position ZC is set at the next Z-height step within the range R of the VFL lens. If the last Z-height step within the range R has been reached, the routine continues to a block 770, where the ZC versus FDi curves are smoothed/interpolated to provide fine-grained lookup tables for future VFL lens control and relative flash timing delays between illumination wavelengths. In various implementations, the final lookup table may be stored with one of the wavelengths designated as a reference wavelength, and the FDi values for all of the other wavelengths may be stored as time offsets from the FDi value for the reference wavelength. In various implementations, the FDi values and/or time offsets may be utilized to adjust the flash timings for the respective wavelength image exposure contributions so as to bring all of the N focal planes to the same Z-height, as described above with respect to FIG. 6B.

Figure 8:
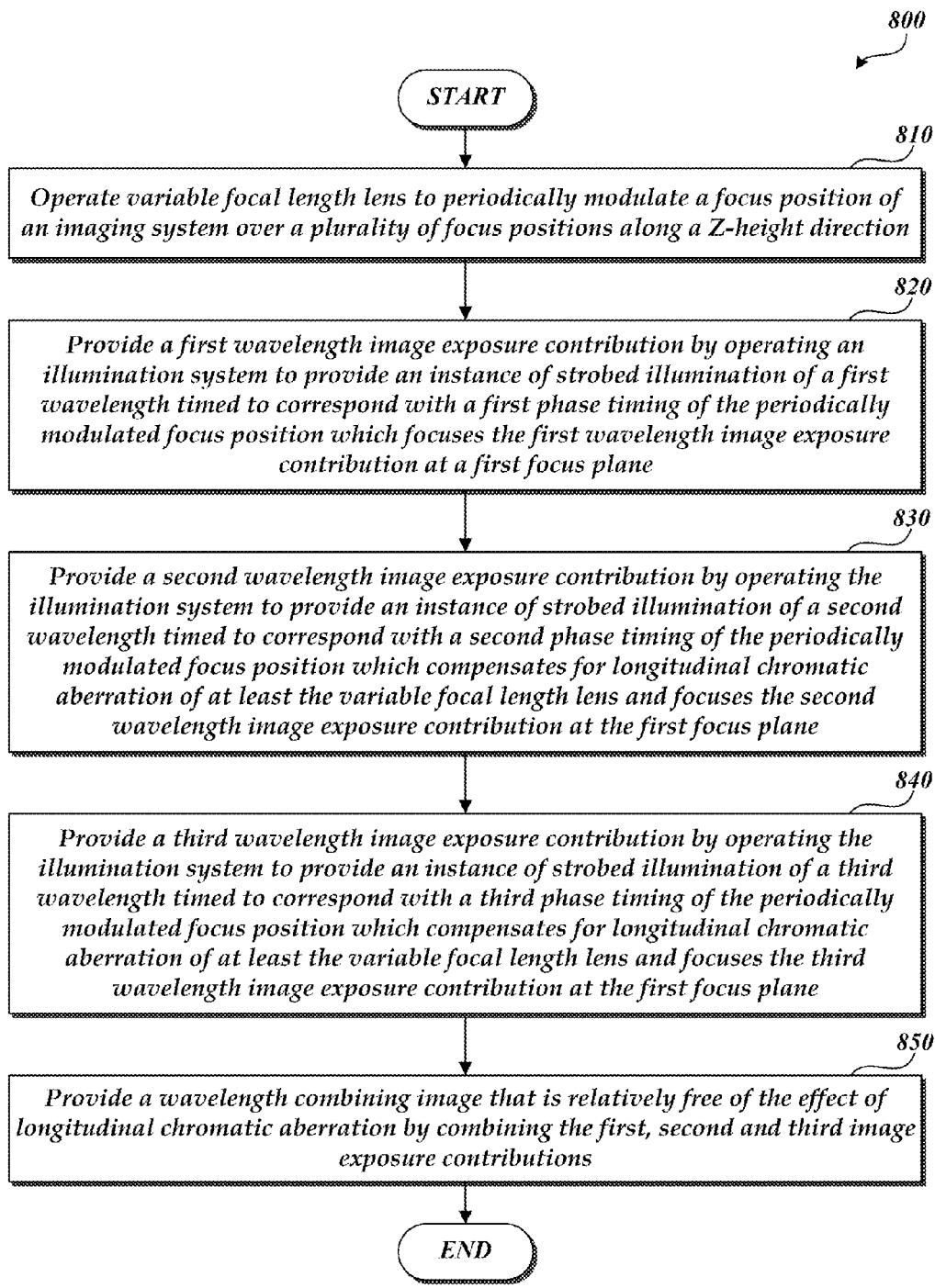
FIG. 8 is a flow diagram illustrating one exemplary implementation of a routine for operating an image acquisition system to provide an image that is relatively free of the effect of longitudinal chromatic aberration in one or more lenses of the image acquisition system.

FIG. 8 is a flow diagram illustrating one exemplary implementation of a routine 800 for operating an image acquisition system to provide an image that is relatively free of the effect of longitudinal chromatic aberration in one or more lenses of the image acquisition system. At a block 810, a VFL lens is operated to periodically modulate a focus position of an imaging system over a plurality of focus positions along a Z-height direction. At a block 820, a first wavelength image exposure contribution is provided by operating an illumination system to provide an instance of strobed illumination of a first wavelength timed to correspond with a first phase timing of the periodically modulated focus position which focuses the first wavelength image exposure contribution at a first focus plane (e.g., such as the phase timing φ15 for the illumination wavelength λG at the Z-height Zi, as illustrated in FIG. 6B).

At a block 830, a second wavelength image exposure contribution is provided by operating the illumination system to provide an instance of strobed illumination of a second wavelength timed to correspond with a second phase timing of the periodically modulated focus position which compensates for longitudinal chromatic aberration of at least the VFL lens and focuses the second wavelength image exposure contribution at the first focus plane (e.g., such as the phase timing φ12 for the illumination wavelength λB at the Z-height Zi, as illustrated in FIG. 6B).

At a block 840, a third wavelength image exposure contribution is provided by operating the illumination system to provide an instance of strobed illumination of a third wavelength timed to correspond with a third phase timing of the periodically modulated focus position which compensates for longitudinal chromatic aberration of at least the VFL lens and focuses the third wavelength image exposure contribution at the first focus plane (e.g., such as the phase timing φ18 for the illumination wavelength λR at the Z-height Zi, as illustrated in FIG. 6B).

At a block 850, a wavelength combining image that is relatively free of the effect of longitudinal chromatic aberration is provided by combining the first, second and third image exposure contributions. In one implementation, the providing of the wavelength combining image may include providing the first, second and third image exposure contributions during a single image integration period of a detector of the imaging system. In an alternative implementation, the providing of the wavelength combining image may include computationally combining first, second and third sets of image data provided by a detector of the imaging system. In such an implementation, the first set of image data may include an image exposed using the first image exposure contribution and not the second or third image exposure contributions, the second set of image data may include an image exposed using the second image exposure contribution and not the first or third image exposure contributions, and the third set of image data may include an image exposed using the third image exposure contribution and not the first or second image exposure contributions.

In one implementation, the first, second and third wavelengths may correspond to three types of color detectors (e.g., green, blue and red) used in a color camera included in the imaging system. In various implementations, different numbers of image exposure contributions may be utilized (e.g., two, four, five, etc.) In implementations where additional image exposure contributions are utilized, such may be provided by operating the illumination system to provide instances of strobed illumination of additional wavelengths timed to correspond with additional phase timings of the periodically modulated focus position which compensate for longitudinal chromatic aberration of at least the VFL lens and focus the additional wavelength image exposure contributions at the first focus plane.

It will be appreciated that the principles disclosed herein may in various implementations be applied to systems utilizing different types of illumination sources. For example, the disclosed techniques may be applied to different systems utilizing a broad range of wavelengths, such as combining visible and near-infrared (NIR) imaging without a focus shift (e.g., multispectral images). As another example, visible light imaging may be combined with NIR or UV laser focusing through the same optics (e.g., where a laser source is strobed in synchronization with the visible light imaging, but with a phase shift to correct for longitudinal chromatic aberration). As noted above, in accordance with the principles disclosed herein, synthetic white (e.g., "broadband") illumination may be achieved with a VFL lens with reduced longitudinal chromatic aberration for improved image quality and better Z and/or X-Y measurement accuracy (e.g., for measured workpiece features). For various metrology applications, utilization of such broadband illumination may be preferred over utilization of narrow band (e.g., monochrome) illumination. In various implementations, the corrections for longitudinal chromatic aberration may also allow for less expensive and/or simpler objective lenses (e.g., achromat, etc.) to be utilized for achieving chromatic aberration performance that is comparable to more expensive lenses (e.g., apochromat, etc.).

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for operating an image acquisition system to provide an image that is relatively free of an effect of longitudinal chromatic aberration in one or more lenses of the image acquisition system, the image acquisition system comprising an imaging system including a variable focal length lens, an illumination system, and a controller, the method comprising:
    operating the variable focal length lens to periodically modulate a focus position of the imaging system over a plurality of focus positions along a Z-height direction;
    providing a first wavelength image exposure contribution by operating the illumination system to provide an instance of strobed illumination of a first wavelength timed to correspond with a first phase timing of the periodically modulated focus position which focuses the first wavelength image exposure contribution at a first focus plane;
    providing a second wavelength image exposure contribution by operating the illumination system to provide an instance of strobed illumination of a second wavelength timed to correspond with a second phase timing of the periodically modulated focus position which compensates for longitudinal chromatic aberration of at least the variable focal length lens and focuses the second wavelength image exposure contribution at the first focus plane, wherein the second wavelength is different than the first wavelength and the second phase timing occurs after the first phase timing; and
    providing a wavelength combining image that is relatively free of the effect of longitudinal chromatic aberration by combining the first and second wavelength image exposure contributions, wherein the combining of the first and second wavelength image exposure contributions to provide the wavelength combining image comprises providing both the first and second wavelength image exposure contributions during a single image integration period of a detector of the imaging system.

2. The method of claim 1, wherein:
    the illumination system includes first and second sources of illumination;
    the operating of the illumination system to provide the instance of strobed illumination of the first wavelength comprises operating the first source of illumination; and
    the operating of the illumination system to provide the instance of strobed illumination of the second wavelength comprises operating the second source of illumination.

3. The method of claim 1, further comprising providing a third wavelength image exposure contribution by operating the illumination system to provide an instance of strobed illumination of a third wavelength timed to correspond with a third phase timing of the periodically modulated focus position which compensates for longitudinal chromatic aberration of at least the variable focal length lens and focuses the third wavelength image exposure contribution at the first focus plane.

4. The method of claim 3, wherein the first, second and third wavelengths correspond to three types of color detectors used in a color camera included in the imaging system.

5. The method of claim 3, further comprising providing additional image exposure contributions by operating the illumination system to provide instances of strobed illumination of additional wavelengths timed to correspond with additional phase timings of the periodically modulated focus position which compensate for longitudinal chromatic aberration of at least the variable focal length lens and focus the additional wavelength image exposure contributions at the first focus plane.

6. The method of claim 1, further comprising providing calibration data that at least in part:
    relates phase timing of the periodically modulated focus position to a focus plane height or distance for the first wavelength; and
    relates phase timing of the periodically modulated focus position to a focus plane height or distance for the second wavelength.

7. The method of claim 6, wherein the second phase timing of the periodically modulated focus position which compensates for longitudinal chromatic aberration is determined based on at least a portion of the calibration data and at least one of the first phase timing or a height or distance of the first focus plane.

8. The method of claim 6, wherein the providing of the calibration data comprises:
    collecting a first image stack comprising respective images focused at respective Z-heights, wherein each image of the first image stack is exposed using an instance of strobed illumination of the first wavelength timed to correspond with a phase timing of the periodically modulated focus position corresponding to a Z-height within the image stack;

collecting a second image stack comprising respective images focused at respective Z-heights, wherein each image of the second image stack is exposed using an instance of strobed illumination of the second wavelength timed to correspond with a phase timing of the periodically modulated focus position corresponding to a Z-height within the image stack;

analyzing the first image stack to determine a first phase timing corresponding to a best focus position for a first region of interest at a first Z-height;

analyzing the second image stack to determine a second phase timing corresponding to a best focus position for the first region of interest at the first Z-height; and storing as calibration data the first and second phase timings as associated with the first and second wavelengths, respectively, and as associated with the first the Z-height, wherein the first Z-height corresponds to the first focus plane.

9. The method of claim 8, wherein the providing of the calibration data further comprises adjusting the height of the first region of interest through a plurality of Z-heights in addition to the first Z-height, and for each Z-height repeating the collecting and analyzing of the first and second image stacks and the storing of the phase timings as associated with the respective first and second wavelengths and as associated with the respective Z-height.

10. The method of claim 1, wherein the second phase timing of the periodically modulated focus position which compensates for longitudinal chromatic aberration is determined based at least in part on:
at least one of the first phase timing, or a height or distance of the first focus plane that corresponds to the first phase timing; and
calibration data that relates the phase timing of the periodically modulated focus position to corresponding focus plane heights or distances for the second wavelength.

11. The method of claim 10, wherein the calibration data is established during a learn mode which includes acquiring one or more image stacks and determining one or more focus peaks for the acquired one or more image stacks.

12. An image acquisition system, comprising:
an imaging system including a variable focal length lens that is utilized to periodically modulate a focus position of the imaging system over a plurality of focus positions along a Z-height direction;
an illumination system;
a memory for storing programmed instructions; and
a processor configured to execute the programmed instructions to perform operations including:
providing a first wavelength image exposure contribution by operating the illumination system to provide an instance of strobed illumination of a first wavelength timed to correspond with a first phase timing of the periodically modulated focus position which focuses the first wavelength image exposure contribution at a first focus plane;
providing a second wavelength image exposure contribution by operating the illumination system to provide an instance of strobed illumination of a second wavelength timed to correspond with a second phase timing of the periodically modulated focus position which compensates for longitudinal chromatic aberration of at least the variable focal length lens and focuses the second wavelength image exposure contribution at the first focus plane, wherein the second wavelength is different than the first wavelength and the second phase timing occurs after the first phase timing; and
providing a wavelength combining image that is relatively free of the effect of longitudinal chromatic aberration by combining the first and second wavelength image exposure contributions, wherein the combining of the first and second wavelength image exposure contributions to provide the wavelength combining image comprises providing both the first and second wavelength image exposure contributions during a single image integration period of a detector of the imaging system.

13. The image acquisition system of claim 12, wherein:
the illumination system comprises first and second sources of illumination;
the operating of the illumination system to provide the instance of strobed illumination of the first wavelength comprises operating the first source of illumination; and
the operating of the illumination system to provide the instance of strobed illumination of the second wavelength comprises operating the second source of illumination.

14. The image acquisition system of claim 12, wherein:
a third wavelength image exposure contribution is provided by operating the illumination system to provide an instance of strobed illumination of a third wavelength timed to correspond with a third phase timing of the periodically modulated focus position which compensates for longitudinal chromatic aberration of at least the variable focal length lens and focuses the third wavelength image exposure contribution at the first focus plane; and
the imaging system further includes a color camera using at least three types of color detectors which correspond to the first, second and third wavelengths.

15. A computer readable non-transitory storage medium with instructions stored thereon that are executable by a processor to perform operations of:
operating a variable focal length lens to periodically modulate a focus position of an imaging system over a plurality of focus positions along a Z-height direction;
providing a first wavelength image exposure contribution by operating an illumination system to provide an instance of strobed illumination of a first wavelength timed to correspond with a first phase timing of the periodically modulated focus position which focuses the first wavelength image exposure contribution at a first focus plane;
providing a second wavelength image exposure contribution by operating the illumination system to provide an instance of strobed illumination of a second wavelength timed to correspond with a second phase timing of the periodically modulated focus position which compensates for longitudinal chromatic aberration of at least the variable focal length lens and focuses the second wavelength image exposure contribution at the first focus plane, wherein the second wavelength is different than the first wavelength and the second phase timing occurs after the first phase timing; and
providing a wavelength combining image that is relatively free of the effect of longitudinal chromatic aberration by combining the first and second wavelength image exposure contributions, wherein the combining of the first and second wavelength image exposure contributions to provide the wavelength combining image comprises providing both the first and second wavelength image exposure contributions during a single image integration period of a detector of the imaging system.

16. The computer readable non-transitory storage medium of claim 15, wherein the second phase timing of the periodically modulated focus position which compensates for longitudinal chromatic aberration is determined based at least in part on calibration data and at least one of the first phase timing or the height of the first focus plane.

17. The computer readable non-transitory storage medium of claim 16, wherein the instructions are executable by the processor to further perform operations including determining the calibration data based at least in part on acquiring one or more image stacks and determining one or more focus peaks for the acquired one or more image stacks during a learn mode.

18. The image acquisition system of claim 12, wherein the programmed instructions when executed by the processor further perform operations including providing calibration data that at least in part:

relates phase timing of the periodically modulated focus position to a focus plane height or distance for the first wavelength; and relates phase timing of the periodically modulated focus position to a focus plane height or distance for the second wavelength.

19. The image acquisition system of claim 18, wherein the programmed instructions when executed by the processor further perform operations including determining the second phase timing of the periodically modulated focus position based at least in part on at least a portion of the calibration data and at least one of the first phase timing or a height or distance of the first focus plane.

20. The image acquisition system of claim 18, wherein the programmed instructions when executed by the processor further perform operations including determining the calibration data based at least in part on acquiring one or more image stacks and determining one or more focus peaks for the acquired one or more image stacks during a learn mode.

\* \* \* \* \*